J. B. WICKERSHAM.
Iron-Fence.
No. 6,685. Reissued Oct. 5, 1875.
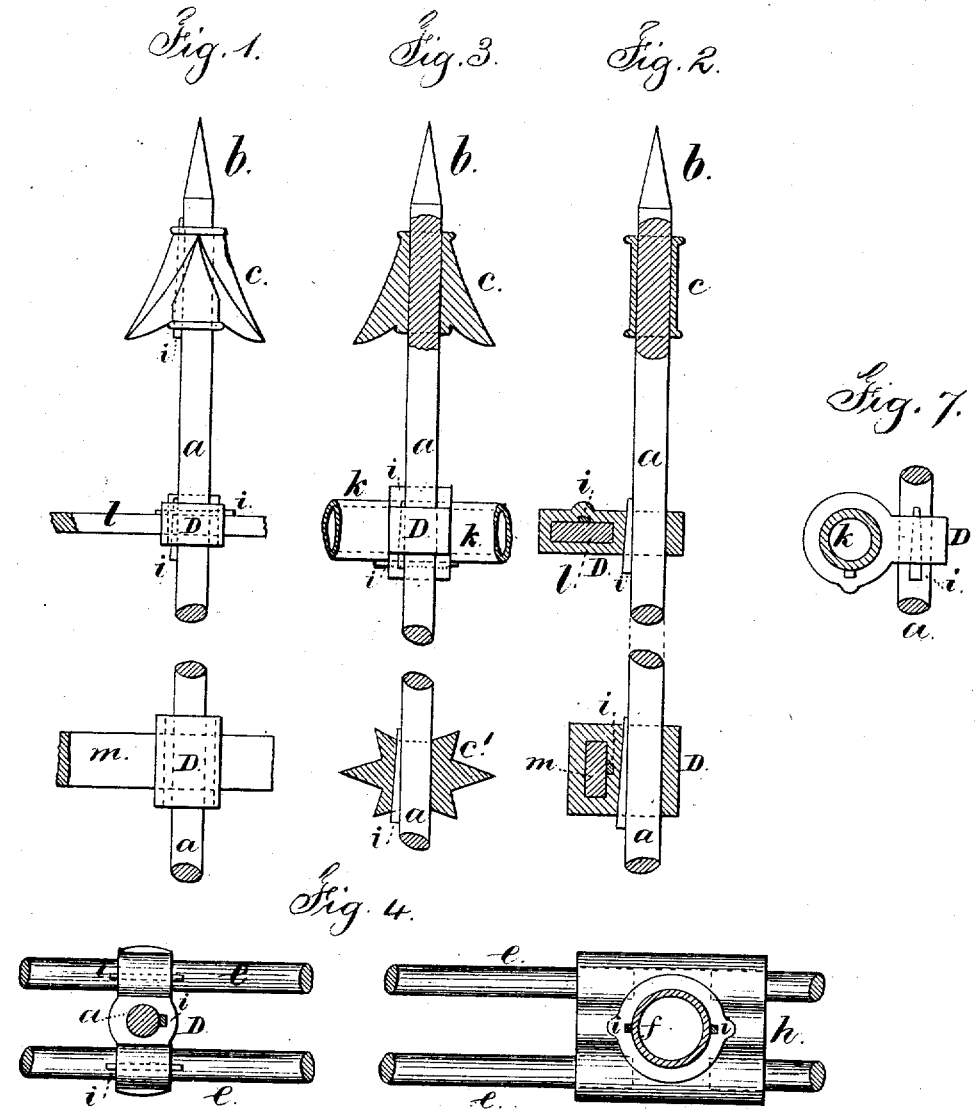
Witnesses,
Chas. H. Smith
Harold Serrell
Inventor
John B. Wickersham
per L. W. Serrell
Atty.
N. PETERS, PHOTO-LITHOGRAPHER, WASHINGTON, D. C.

UNITED STATES PATENT OFFICE.

JOHN B. WICKERSHAM, OF PHILADELPHIA, PENNSYLVANIA.

IMPROVEMENT IN IRON FENCES.

Specification forming part of Letters Patent No. 135,188, dated January 21, 1873; reissue No. 6,685, dated October 5, 1875; application filed May 3, 1875.

*To all whom it may concern:*

Be it known that I, JOHN B. WICKERSHAM, of Philadelphia, in the State of Pennsylvania, have invented an Improvement in Iron Fences, of which the following is a specification:

Iron fences have been made with vertical bars or pickets with cast-iron ornaments forming the upper ends; but these are liable to be broken. To avoid this I make a top ornament at a distance above the top bar, and the wrought-iron bar or rod itself passes through this ornament and forms the top thereof, the entire ornament being above the horizontal bars.

Iron bars have been united to form a fence by casting iron at the points of intersection. This, contracting around the bars, forms an immovable union. When the railing is being put up there is frequently difficulty in making the sections join to each other or conform to the grade or inclination of railing or locality.

I avoid all these difficulties by making the railing with cast-iron connecting-blocks with holes for receiving the horizontal and vertical or inclined bars, so that the parts can be slipped together to form sections or to build the iron fence progressively; and these iron connecting-blocks are made with key-seats, so that the parts of the fence will be permanently secured together by driving in tapering keys, which, for convenience, may be cut nails, and these will effectually prevent any slipping of one part upon the other, or the accidental dropping out of any of the keys, especially after the paint, asphalt, or other material has been used to cover the fence, and these keys are preferable when sufficiently long to pass entirely through the ornament and be turned up or riveted at the point.

In the drawing, Figure 1 is an elevation of a picket and connecting-blocks. Fig. 2 is a partial section transversely of the fence. Fig. 3 is a partial section of the picket and ornaments. Fig. 4 is a sectional plan. Fig. 5 is a sectional elevation of a connecting-block at the post, and Fig. 6 is a similar view of the picket.

The pickets *a* are of suitable size, and their upper ends *b* form part of the top ornaments, the remainder of such ornaments being composed of cast-iron, as at *c*—that is, either secured by keys or otherwise around the picket. The rails or bars are either horizontal or inclined, and D is the connecting-block, of cast metal, with holes or openings into or through it, running at right angles or inclined to each other, and the respective openings are shown with slots or key-seats for the reception of keys or nails, as at *i*.

Where the horizontal and vertical bars are both round they are to pass each other, as shown in Figs. 4 and 6, the connecting-block being shaped accordingly.

Where the bars *e* are united to the post *f*, the connecting-block D should be made similarly to that shown at *h*, Figs. 4 and 5.

The posts are adapted to the other parts of the fence, and may be polygonal or round and tubular or solid. In Figs. 4 and 5 I have shown the post tubular.

The horizontal rail may be a tube, as at *k*, and the connecting-block D will be similar to that shown in Figs. 3 and 7. Where the rails of the fence are composed of flat metal bars *l* *m*, the connecting-blocks D are to be made as shown in Figs. 1 and 2.

When flat metal bars are used for fences, they have sometimes been placed with the longest sectional measurement vertically. In this position the fence is not sufficiently stiff. I therefore employ bars, some of which are laid flatwise, as at *l*, to stiffen the fence horizontally; and others, as at *m*, are placed up edgewise to support the weight of the parts between the posts.

Fences made in the aforesaid manner can be compactly boxed for shipment and put together with facility; and the parts are adapted to the varying circumstances that arise in manufacturing or putting up fences.

The ornament *c'*, Fig. 3, may be connected to the picket *a* by a key in the same manner as the blocks D are secured in place.

By the use of key-seats cast in the connecting-blocks the cost is not increased, and the keys, when driven into the seats, form very firm and reliable connecting devices.

I claim as my invention—

1. The metal connecting-block D, made with holes through them for the bars and seats for the wedges or keys that bind such blocks to the bars, substantially as set forth.

2. The picket of an iron fence made with the upper end of the iron picket projecting through and above the cast metal that forms the ornament contiguous to such upper end of the picket, as set forth.

3. The ornament *c'* for an iron fence, containing a key-seat and secured to the iron picket by a wedge or key, substantially as set forth.

4. The independent cast-iron connecting-block *h* for an iron fence, made separately from and secured to the post *f*, and provided with holes entering such block in opposite directions, for receiving the ends of the two wrought-iron bars *e* and sustaining them, substantially as set forth.

5. An iron fence made with the pickets *a*, connecting-blocks D, rail *l* placed flatwise and rail *m* placed edgewise, said rails being at the sides of the pickets, as and for the purposes set forth.

Signed by me this 28th day of April, 1875.

JOHN B. WICKERSHAM.

Witnesses:

GEO. T. PINCKNEY,
CHAS. H. SMITH.